US008713673B2

(12) United States Patent
Kitamura

(10) Patent No.: US 8,713,673 B2
(45) Date of Patent: Apr. 29, 2014

(54) QUALIFICATION SCREENING SYSTEM AND SCREENING METHOD THEREOF, QUALIFICATION SCREENING DEVICE AND DEVICE UNDER QUALIFICATION SCREENING

(75) Inventor: Hiroshi Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 1444 days.

(21) Appl. No.: 11/683,207

(22) Filed: Mar. 7, 2007

(65) Prior Publication Data

US 2007/0276960 A1   Nov. 29, 2007

(30) Foreign Application Priority Data

Mar. 31, 2006   (JP) .................... 2006-096881

(51) Int. Cl.
*G06F 15/173* (2006.01)
*G06F 9/445* (2006.01)

(52) U.S. Cl.
CPC ..................... *G06F 8/65* (2013.01)
USPC ............................ 726/22; 726/25

(58) Field of Classification Search
CPC ........................................ G06F 8/65
USPC ........................................ 726/22, 25
See application file for complete search history.

(56) References Cited

U.S. PATENT DOCUMENTS

| | | | | |
|---|---|---|---|---|
| 6,345,308 B1* | 2/2002 | Abe | ........................ | 709/248 |
| 6,735,434 B2* | 5/2004 | Criss et al. | ................. | 455/418 |
| 7,069,292 B2* | 6/2006 | Sugahara | ................. | 709/203 |
| 7,376,870 B2* | 5/2008 | Kataria et al. | ............. | 714/47 |
| 7,457,674 B2* | 11/2008 | Yuan et al. | ................. | 700/31 |
| 7,600,219 B2* | 10/2009 | Tsantilis | ................. | 717/122 |
| 2002/0004402 A1* | 1/2002 | Suzuki | ................. | 455/456 |

(Continued)

FOREIGN PATENT DOCUMENTS

| | | |
|---|---|---|
| JP | 05-028117 A | 2/1993 |
| JP | 05-274137 A | 10/1993 |

(Continued)

OTHER PUBLICATIONS

Symborski; Updating software and configuration data in a distributed communications network; Apr. 1988; Proceedings of the IEEE; Computer Networking Symposium, 1988, pp. 331-338.*

(Continued)

*Primary Examiner* — Bradley Holder
(74) *Attorney, Agent, or Firm* — Sughrue Mion, PLLC

(57) ABSTRACT

The present invention provides a qualification screening system which is capable of performing qualification screening on a device under qualification screening using a status of information to be updated that is retained by the device under qualification screening without having to know concrete procedures or methods for updating such information. A qualification screening device estimates the status of information to be updated that is retained by the device under qualification screening from a time at which an information update program that updates the information to be updated, which is independent of update procedures or methods, was activated and update processing was last updated, and compares the information with a time of a scheduled issuance of information to be updated, retained in qualification screening condition information of the qualification screening device itself, to perform qualification screening. A common time at which information exchange was performed between the qualification screening device and the device under qualification screening is used as reference in order to perform an effective comparison using time information among devices that are not synchronized.

13 Claims, 3 Drawing Sheets

(56) References Cited

U.S. PATENT DOCUMENTS

| | | | |
|---|---|---|---|
| 2004/0049519 A1* | 3/2004 | Itakura et al. | 707/104.1 |
| 2005/0004926 A1* | 1/2005 | Ohtani | 707/100 |
| 2005/0005169 A1* | 1/2005 | Kelekar | 713/201 |
| 2005/0044535 A1* | 2/2005 | Coppert | 717/127 |
| 2006/0236083 A1* | 10/2006 | Fritsch et al. | 713/1 |

FOREIGN PATENT DOCUMENTS

| | | |
|---|---|---|
| JP | 10-293704 A | 11/1998 |
| JP | 2002-351906 A | 12/2002 |
| JP | 2003-076434 A | 3/2003 |
| JP | 2003-309793 A | 10/2003 |
| JP | 2004-355450 A | 12/2004 |
| JP | 2005-099967 A | 4/2005 |
| JP | 2005-128622 A | 5/2005 |
| JP | 2005-167884 A | 6/2005 |
| JP | 2005-322964 A | 11/2005 |
| WO | 2006/003914 A1 | 1/2006 |

OTHER PUBLICATIONS

Tajibnapis; A correctness proof of a topology information maintenance protocol for a distributed computer network; Jul. 1977; Communications of the ACM; vol. 20 Issue 7, Jul. 1977, pp. 477-485.*

Nikkei Byte, Sengoku Makoto, "A new battle against a security hole, do not manufacture, do not show, do not let to use Part 5 not spread: Decrease a risk by an virus and an isolation", Nikkei BP Corporation, Jun. 22, 2004, No. 254, pp. 48-50, Japan.

Japanese Office Action dated Sep. 6, 2011 for corresponding Japanese patent application No. 2006-096881.

* cited by examiner

QUALIFICATION SCREENING SYSTEM AND SCREENING METHOD THEREOF, QUALIFICATION SCREENING DEVICE AND DEVICE UNDER QUALIFICATION SCREENING

BACKGROUND OF THE INVENTION

1. Field of the Invention

The present invention is related to a qualification screening system and a screening method thereof, a qualification screening device and a device under qualification screening. More particularly, the present invention relates to a qualification screening system that performs screening on whether a device under qualification screening satisfies qualifications based on a status of information to be updated that is retained by the device under qualification screening, a screening method thereof, a qualification screening device and a device under qualification screening.

2. Description of the Prior Art

When connecting to a network to perform communication, it is desirable to undergo qualification screening to check whether a communication device to be connected is not infected with a virus, whether a latest patch (bug fix program) has been applied, or whether a definition file of an anti-virus program is up to date, and commence communication only after passing the screening. Otherwise, there is a risk that the communication device to be connected may act as a contamination source and contaminates the network, or that the communication device may place itself at risk of attacks.

On the other hand, as an example of such a communication system, a security update monitoring device which schedules the update management is disclosed in, for instance, Patent Document 1 (Japanese Patent Laid-Open No. 2003-076434). The security update monitoring device provides the update schedule management data in which time and date information added for an update execution is accumulated and an update execution schedule management section that monitors the update schedule management data and issues performance instructions.

In addition, an image time correction method is disclosed which compares the time of a personal computer with that of a camera, and when the time difference is equal to or greater than a predetermined time, corrects the time of the camera and the time of an image recorded on the camera (for instance, refer to Patent Document 2: Japanese Patent Laid-Open No. 2003-309793).

Furthermore, a communication system is disclosed which is capable of recognizing when a proper security measure was last implemented by cross-checking a version of an OS (operating system) installed on each terminal device against a date on which an advisory indicating the presence of a security hole was released (for instance, refer to Patent Document 3: Japanese Patent Laid-Open No. 2005-322964).

Moreover, an out-of-sequence processing prevention method is disclosed wherein, when an update program is selected and an update date is inputted, update sequence checking means references the contents of an update information storage section to determine whether the selected update program should be executed, and prevents execution of the selected update program when the inputted update date differs from an scheduled update date and when processing by a required predecessor program has not been performed (for instance, refer to Patent Document 4: Japanese Patent Laid-Open No. H05-274137).

BRIEF SUMMARY OF THE INVENTION

However, with conventional communication systems, procedures for information updating of software containing information to be updated either lack uniformity or are not disclosed. As a result, information updating is performed using a wide variety of methods that varies according to each software, making it extremely difficult for a person other than the developer of an information update program to acknowledge an update status thereof.

In addition, what information should be updated depends on statuses such as: which function of what kind of software is chosen and installed or how such software is configured, or how hardware of a device is configured and in what state device drivers and the like corresponding to such hardware have been installed. Such statuses normally differ from device to device, and are never shared across all devices.

In this light, in regards to what information should be updated, an information update program is used on a per-device basis to determine a status thereof and to perform updating based on acquired information. Thus, checking update statuses is a complicated procedure requiring a large number of processing.

Therefore, even checking an update status in regards to one particular method is difficult. Needless to say, there are no general-purpose update status checking methods or the like that are independent of update procedures or methods.

On the other hand, while the inventions disclosed in Patent Documents 1, 3 and 4 determine whether an information update was performed based on time information, version information or update date, the inventions do not disclose a configuration of the present invention in which a comparison of a time of activation of an information update program retained by a device under qualification screening with a time of a scheduled issuance of information to be updated that is retained by a qualification screening device is performed using current times of a clock provided at each qualification device.

In addition, the technology disclosed in Patent Document 2 simply compares a time of a personal computer with that of a camera, and synchronizes the times when a discrepancy is found therebetween.

In consideration of the above, an object of the present invention is to provide a qualification screening system and a screening method thereof, a qualification screening device and a device under qualification screening that are capable of: gathering a status of information to be updated, retained by the device under qualification screening, which will be used as information for determination during qualification screening, without having to know concrete procedures or methods for updating such information; using the information as information for determination during qualification screening independent of procedures or methods for updating such information; and controlling communication that may be performed by the device under qualification screening according to the results of such qualification screening.

In order to achieve the object described above, a qualification screening system according to the present invention includes: a device under qualification screening to which software update information is to be provided via a communication network; and a qualification screening device that determines to what extent updates of information installed on the device under qualification screening were performed, and based on the determination results, performs qualification screening to screen whether the device under qualification screening satisfies qualifications, wherein the qualification screening device includes comparison means of comparing a time of a last update of an information update program retained by the device under qualification screening with a time of a scheduled issuance of information to be updated that is retained by the qualification screening device based on a time of information exchange, which is a time point that is common to the qualification screening device and the device under qualification screening, and based on the comparison results, the qualification screening device determines to what extent updates of information installed on the device under qualification screening were performed.

In addition, a qualification screening method according to the present invention is a qualification screening method in a qualification screening system that includes: a device under qualification screening to which software update information is to be provided via a communication network; and a qualification screening device that determines to what extent updates of information installed on the device under qualification screening were performed, and based on the determination results, performs qualification screening to screen whether the device under qualification screening satisfies qualifications, wherein the qualification screening method, provided in the qualification screening device, includes a comparison step for comparing a time of a last update of an information update program retained by the device under qualification screening with a time of a scheduled issuance of information to be updated that is retained by the qualification screening device based on a time of information exchange, which is a time point that is common to the qualification screening device and the device under qualification screening, and based on the comparison results, the qualification screening method determines to what extent updates of information installed on the device under qualification screening were performed.

Furthermore, a qualification screening device according to the present invention is a qualification screening device that determines to what extent updates of information installed on the device under qualification screening were performed, and based on the determination results, performs qualification screening to screen whether the device under qualification screening satisfies qualifications, wherein the qualification screening device comprising comparison means of comparing a time of a last update of an information update program retained by the device under qualification screening with a time of a scheduled issuance of information to be updated that is retained by the qualification screening device based on a time of information exchange, which is a time point that is common to the qualification screening device and the device under qualification screening, and based on the comparison results, determining to what extent updates of information installed on the device under qualification screening were performed.

Moreover, a device under qualification screening according to the present invention is a device under qualification screening comprising an information update program and update history information containing activation time information of the information update program, wherein a comparison of a time of a last update of the information update program with a time of a scheduled issuance of information to be updated that is retained by the qualification screening device is performed based on a time of information exchange, which is a time point that is common to the qualification screening device and the device under qualification screening; a determination is made, based on the comparison results, on to what extent updates of information installed on the device under qualification screening were performed; and based on the determination results, screening is performed on whether the device under qualification screening satisfies the qualification.

Advantages of the present invention will now be described. In the present invention, even when information update procedures of software have not been disclosed or when concrete information update procedures inside information update programs of a wide variety of methods which differ among software are unknown, such procedures are not pursued. Instead, information update processing itself is entrusted to the respective information update programs, and the procedures themselves are treated as black boxes. In addition, if an information update program functions correctly, the update status at that time point is determined to be up to date.

Furthermore, as a method for recognizing that an information update program is running and an update status is up to date, external time information is used which is generated upon activation of the information update program and which may be gathered without having to know internal procedures of the information update program.

More specifically, a method is used which examines an update status with the help of external time information such as a time, indicating when an activation and a normal termination of an information update program were performed, generated at an OS-side in response to the activation of the information update program, a time indicating when files used by internal processing of the information update program had bee generated, referenced and updated, or the like.

In other words, a qualification screening/communication control instruction device acquires external time information that is generated upon activation of an information update program stored in a device under qualification screening. And the device compares the time information with latest information on when information to be updated is being issued that is retained at the qualification screening/communication control instruction device-side. And the device determines whether update of information of the device under qualification screening is up to date. Then, depending on the results of the determination, the qualification screening/communication control instruction device controls communication of the device under qualification screening via a communication control device.

On the other hand, while time information of a general device in which absolute synchronization is not achieved holds significance within the device, such time information is not absolute information. Therefore, such time information may not be used as effective information when comparing the same with time information from outside of the device. In this light, the present invention takes advantage of the nature of a time, at which information is exchanged between devices, in which the time is the same time point at both devices, and time information measured by the clocks of the respective devices are converted into time information of differences from time information of each device involved in the information exchange to be used as comparable effective information.

By using the above-described configuration, the present invention is capable of gathering a status of information to be updated, retained by the device under qualification screening, which will be used as information for determination during qualification screening, without having to know concrete procedures or methods for updating such information, and using the information as information for determination during qualification screening, independent of procedures or methods for updating such information. In addition, the results of such qualification screening may be applied to controlling communication of the device under qualification screening.

DETAILED DESCRIPTION OF THE PREFERRED EMBODIMENTS

Figure 1:
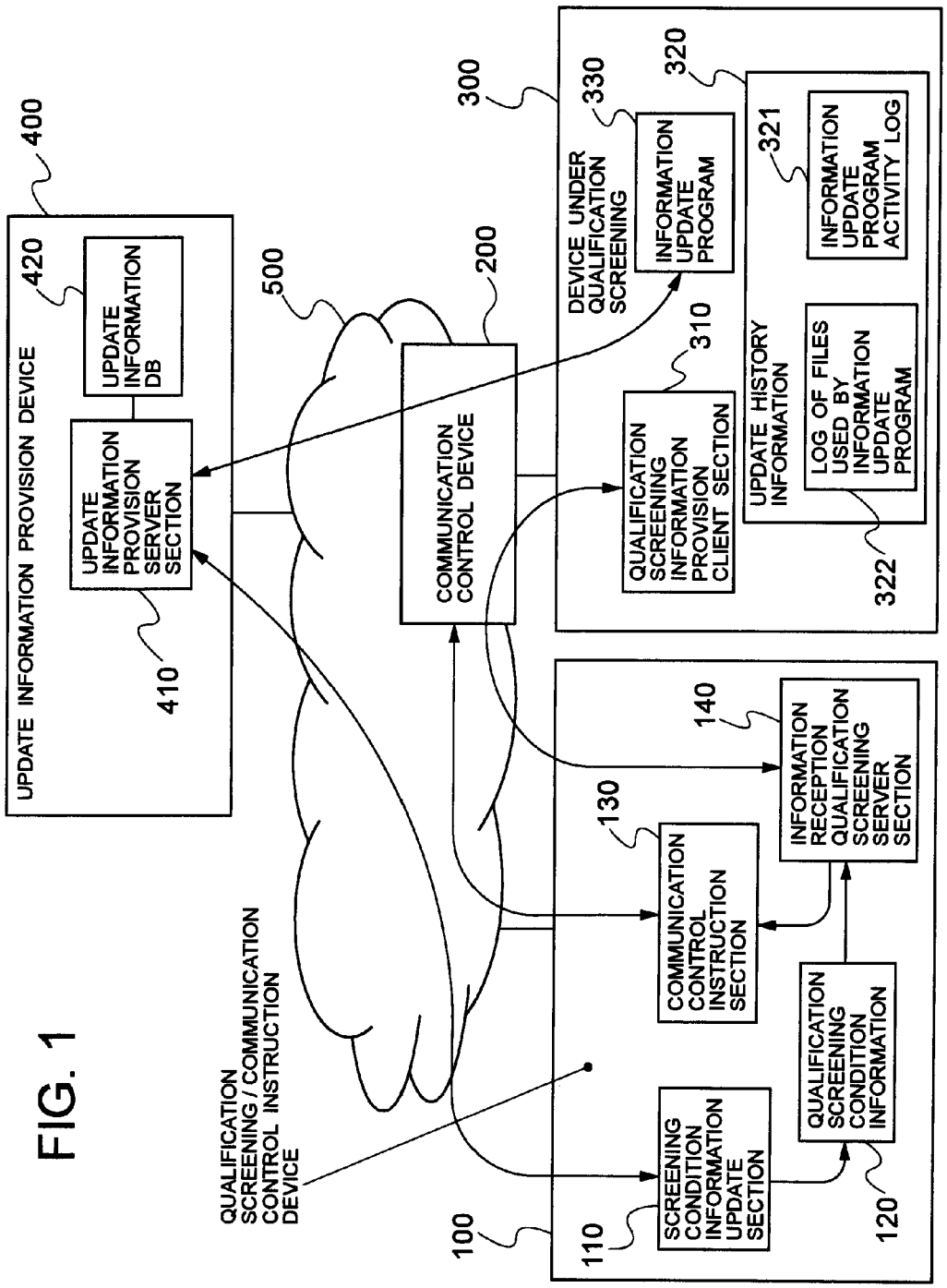
FIG. 1 is a configuration diagram of an exemplary qualification screening system according to the present invention.

Embodiments of the present invention will now be described with reference to the attached drawings. FIG. 1 is a configuration diagram of an exemplary qualification screening system according to the present invention. Referring now to FIG. 1, an exemplary qualification screening system according to the present invention includes a qualification screening/communication control instruction device (hereinafter referred to as "qualification screening device") 100, a communication control device 200, a device under qualification screening 300, an update information provision device 400, and a communication network 500.

The qualification screening device 100, the device under qualification screening 300 and the update information provision device 400 are configured so as to be mutually communicable via the communication network 500. However, communication from the device under qualification screening 300 is arranged as communication via the communication control device 200. Therefore, communication from the device under qualification screening 300 is subject to restrictions according to settings of the communication control device 200.

The qualification screening device 100 performs qualification screening on the device under qualification screening 300. The device under qualification screening 300 will be subject to screening on whether qualifications are satisfied by cross-checking against screening conditions retained by the qualification screening device 100, based on information reflecting an information update status of an information update program 330 installed on the device under qualification screening 300. The update information provision device 400 communicates with the information update program 330 installed on the device under qualification screening 300. As a result, the information update status changes.

Next, a description on a configuration of each device will be provided. The qualification screening device 100 includes a screening condition information update section 110, qualification screening condition information 120, a communication control instruction section 130, and an information reception qualification screening server section 140.

The screening condition information update section 110 updates screening condition information. Qualification screening condition information 120 is information that forms the conditions of the qualification screening. The communication control instruction section 130 outputs instruction signals to the communication control device 200 based on screening results of the device under qualification screening 300. The information reception qualification screening server section 140 performs screening of the device under qualification screening 300.

The device under qualification screening 300 includes a qualification screening information provision client section 310, update history information 320, and the information update program 330. In addition, update history information 320 includes an information update program activity log 321 and a log of files used by the information update program 322.

The qualification screening information provision client section 310 provides the information reception qualification screening server section 140 of the qualification screening device 100 with information that will be subject to qualification screening. Update history information 320 is information indicating update history. The information update program 330 is a program that updates information of the qualification screening device 100 to be updated, including the program itself.

The update information provision device 400 includes an update information provision server 410 and an update information database (DB) 420.

The update information provision server 410 provides the screening condition information update section 110 of the qualification screening device 100 and the information update program 330 of the device under qualification screening 300 with update information via the communication network 500. A single or a plurality of pieces of update information is stored in the update information database 420.

The communication control device 200 controls what kind of communication may be performed by the device under qualification screening 300. The communication control device 200 performs processing according to instructions from the qualification screening device 100.

In an initial state, the communication control device 200 only allows communication between the information update program 330 of the device under qualification screening 300 and the update information provision server 410 of the update information provision device 400, and communication between the qualification screening information provision client section 310 of the device under qualification screening 300 and the information reception qualification screening server section 140 of the qualification screening device 100.

When communication other than those described above are required by the device under qualification screening 300, such communication will be performed after undergoing qualification screening according to the following procedures and changing communication control rules of the communication control device 200.

Figure 2:
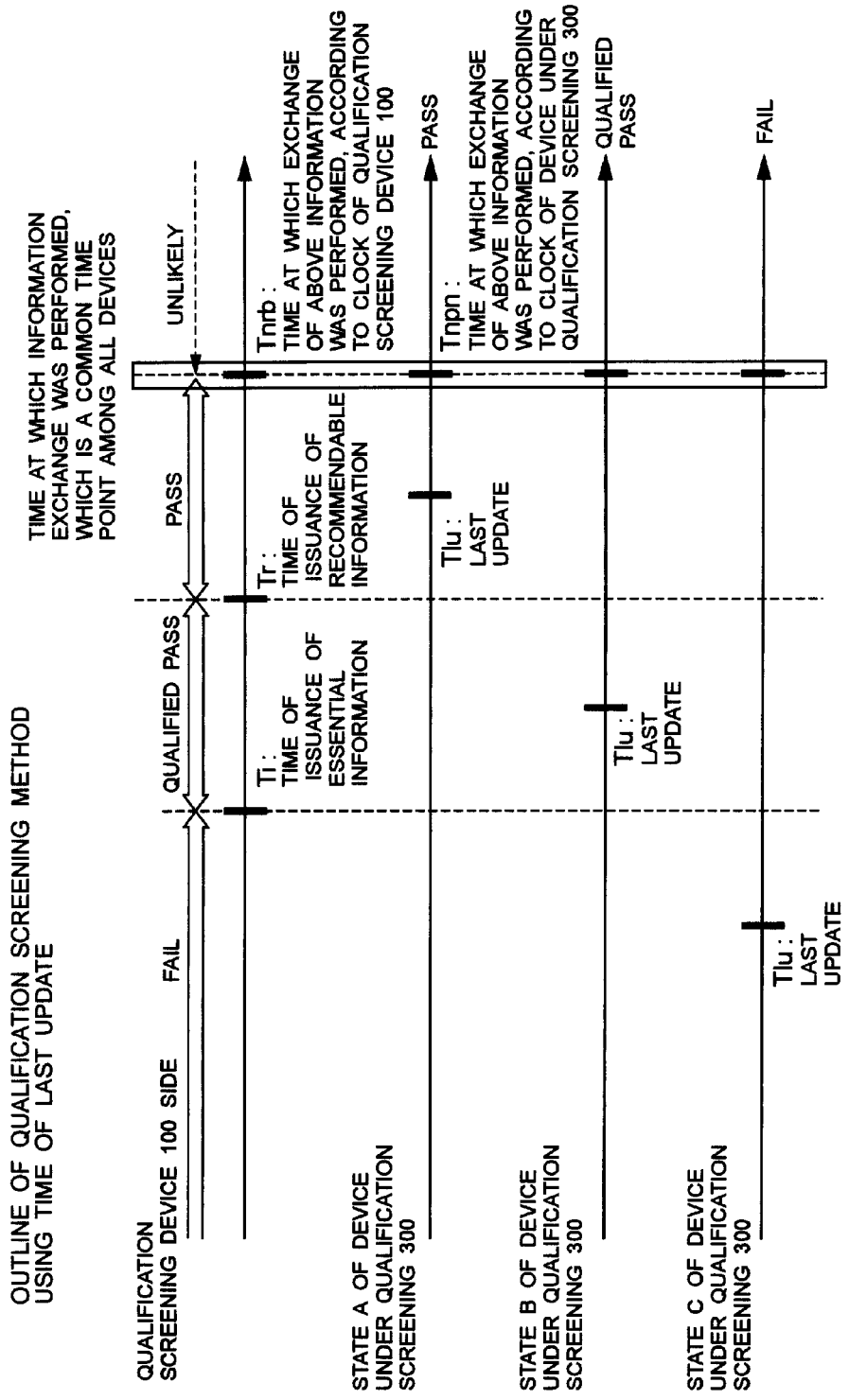
FIG. 2 is a diagram showing an outline of an exemplary qualification screening method according to the present invention.
Figure 3:
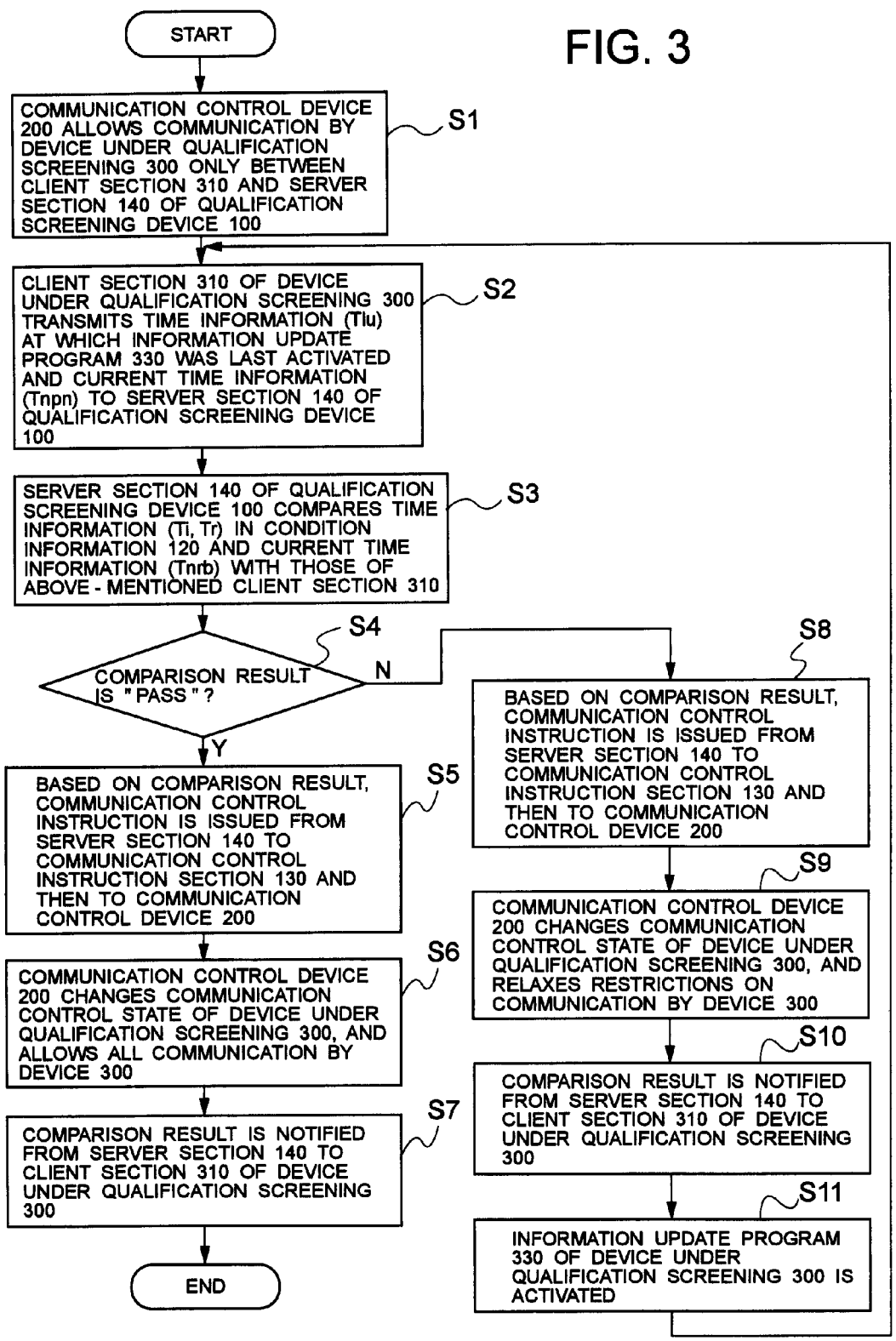
FIG. 3 is a flowchart showing procedures of an exemplary qualification screening method according to the present invention.

Next, operations of the present invention will be described. FIG. 2 is a diagram showing an outline of an exemplary qualification screening method according to the present invention, while FIG. 3 is a flowchart showing procedures of an example of such a method.

Referring now to FIG. 2, the qualification screening device 100 retains information regarding: a time Tnrb measured by a clock, not shown, retained by the qualification screening device 100, at which an information exchange was performed; a time Ti at which essential (for qualification screening) information (for instance, an essential patch 1) was issued by the update information provision device 400; and a time Tr at which recommendable (for qualification screening) information (for instance, a recommended patch 2) was issued by the update information provision device 400 (generally, by the nature of such information, Ti<Tr).

On the other hand, the device under qualification screening 300 retains information regarding: a time Tnpn measured by a clock, not shown, retained by the device under qualification screening 300, at which an information exchange was performed; and a time Tlu (last update) at which the program was last updated.

Time information Tnrb, Ti and Tr, retained by the qualification screening device 100, are information either measured by the clock of the qualification screening device 100 or converted to measurement time of the clock of the qualification screening device 100, and are therefore significant and comparable information as far as the qualification screening device 100 is concerned. In a similar manner, time information Tnpn and Tlu, originally retained by the device under qualification screening 300 and obtained by the information reception qualification screening server section 140 are information measured by the clock of the device under qualification screening 300 and are therefore significant and comparable information as far as the device under qualification screening 300 and the information reception qualification screening server section 140 are concerned.

However, the clock of the qualification screening device 100 differs from the clock of the device under qualification screening 300. Generally, different clocks are not synchronized to display the same time information at the same time point. Therefore, time information of the qualification screening device 100 may not be compared with time information of the device under qualification screening 300 unless some sort of conversion is performed.

Therefore, the characteristics of time information Tnrb and Tnpn are utilized in order to compare time information Tnrb, Ti and Tr of the qualification screening device 100 with time information Tnpn and Tlu of the device under qualification screening 300.

Time information Tnrb and Tnpn are time information measured by the clocks of the respective devices at a time, which is a shared time point between the devices, at which an information exchange was performed. While time information Tnrb and Tnpn indicate different values when measured by clocks that are not synchronized, it is known that the information was measured at the same time point. This nature may be used to perform conversion when comparing time information Tnrb, Ti, Tr with Tnpn, Tlu.

The differential time information based on the time information of the respective device at the time point (Tnrb and Tnpn) at which information exchange was performed can be used as the exchanged, comparable and effective information. More specifically, (Tnrb−Ti) and (Tnrb−Tr) are comparable and effective differential time information at the qualification screening device 100, while (Tnpn−Tlu) is comparable and effective differential time information at the device under qualification screening 300.

Specific operations will now be described with reference to FIG. 3.

In an initial state, the communication control device 200 only allows communication between the qualification screening information provision client section 310 of the device under qualification screening 300 and the information reception qualification screening server section 140 of the qualification screening device 100 (step S1).

The qualification screening information provision client section 310 of the device under qualification screening 300 transmits time information Tlu indicating the last activation of the information update program 330 and a current time information Tnpn to the information reception qualification screening server section 140 of the qualification screening device 100 (step S2).

Next, the information reception qualification screening server section 140 of the qualification screening device 100 compares time information Ti and Tr in the qualification screening condition information 120 and the current time information Tnrb with the received time information Tlu and the current time information Tnpn (step S3). A comparison method thereof will be described later.

When the comparison result is "pass" ("Y" in step S4), based on screening results produced by the information reception qualification screening server section 140 of the qualification screening device 100, information for a communication control instruction to be sent from the communication control instruction section 130 to the communication control device 200 is sent to the communication control instruction section 130. The communication control instruction section 130 issues a communication control instruction to the communication control device 200 (step S5).

Upon receiving the instruction, the communication control device 200 changes the control status of communication of the device under qualification screening 300. In this case, the communication control device 200 changes the control status of the device under qualification screening 300 so as to allow all communications (step S6).

Furthermore, the comparison result is notified from the information reception qualification screening server section 140 of the qualification screening device 100 to the qualification screening information provision client section 310 of the device under qualification screening 300 via the communication control device 200 (step S7). The device under qualification screening 300 thereby recognizes that all communications have been allowed.

On the other hand, when the comparison result is "fail" ("N" in step S4), based on screening results produced by the information reception qualification screening server section 140 of the qualification screening device 100, information for a communication control instruction to be sent from the communication control instruction section 130 to the communication control device 200 is sent to the communication control instruction section 130. The communication control instruction section 130 issues a communication control instruction to the communication control device 200 (step S8).

Upon receiving the instruction, the communication control device 200 relaxes restrictions on communication of the device under qualification screening 300 (step S9). In other words, while the device under qualification screening 300 is still only able to perform restricted communication in the current state, in order to perform processing so that qualifications may be satisfied, the communication control device 200 controls communication so that the device under qualification screening 300 and the update information provision device 400 may communicate with each other.

Furthermore, the comparison result is notified from the information reception qualification screening server section 140 of the qualification screening device 100 to the qualification screening information provision client section 310 of the device under qualification screening 300 via the communication control device 200 (step S10). The device under qualification screening 300 thereby recognizes that restrictions on communications have been relaxed.

Next, in order to fulfill the desire of the device under qualification screening 300, the information update program 330 of the device under qualification screening 300 is activated (step S11) to repeat the processing of steps S2 to S4.

The sequence of the above-described steps S5 to S7 may be changed to a sequence of step S7, S5 and S6. In the same manner, the sequence of the above-described steps S8 to S10 may be changed to a sequence of step S10, S8 and S9.

A detailed description of the comparison method performed in step S3 will now be provided.

(1) A state in which a time subject to comparison (Tnpn−Tlu) of the device under qualification screening 300 is equal to or less than a reference time (Tnrb−Tr) of the qualification screening device 100 corresponds to a state A of the device under qualification screening 300, shown in FIG. 2. In this case, it is determined that an update of recommendable information has already been performed at the device under qualification screening 300, and a screening result of "pass" will be obtained.

(2) A state in which the time subject to comparison (Tnpn–Tlu) of the device under qualification screening 300 exceeds the reference time (Tnrb–Tr) of the qualification screening device 100 and is equal to or less than a reference time (Tnrb–Ti) of the qualification screening device 100 corresponds to a state B of the device under qualification screening 300, shown in FIG. 2. In this case, it is determined that an update of recommendable information has already been performed but an update of essential information has not yet been performed at the device under qualification screening 300, and a screening result of a "qualified pass" will be obtained. A "qualified pass" will be included in "pass" according to the determination performed in the above-mentioned step S4.

(3) A state in which the time subject to comparison (Tnpn–Tlu) of the device under qualification screening 300 exceeds the reference time (Tnrb–Ti) of the qualification screening device 100 corresponds to a state C of the device under qualification screening 300, shown in FIG. 2. In this case, it is determined that both an essential information update and a recommendable information have not yet been performed at the device under qualification screening 300, and a screening result of "fail" will be obtained.

(4) The reference times (Tnrb–Tr), (Tnrb–Ti) and the time subject to comparison (Tnpn–Tlu) will never take negative values. In addition, in the event that the time on the clock of the device under qualification screening 300 differs considerably from a current standard time (a time displayed by a wave clock or the like), a warning will be issued by the qualification screening device 100 to the device under qualification screening 300.

Time information Ti and Tr, which are used for determination during qualification screening, are included in the qualification screening condition information 120 of the qualification screening device 100. This information reflects when the update information database 420 of the update information provision device 400 was last updated.

Next, update methods of the qualification screening condition information 120 will be described. There are three methods which will now be described individually.

(1) Update will be performed manually. In other words, information to the effect that the update information database 420 was updated is obtained in some way, and the information is used to update the qualification screening condition information 120.

(2) The screening condition information update section 110 of the qualification screening device 100 is provided with a function equivalent to an information update program. The screening condition information update section 110 communicates with the update information provision server section 410 of the update information provision device 400 on a regular basis, and when a response from the update information provision server section 410 differs from its last state, the screening condition information update section 110 recognizes that the update information database 420 was updated and updates the qualification screening condition information 120.

(3) When the update information database 420 of the update information provision device 400 is updated, the screening condition information update section 110 of the qualification screening device 100 receives information to effect that such an update was performed from the update information provision server section 410 of the update information provision device 400, and updates the qualification screening condition information 120.

As described above, a first advantage according to an embodiment of the present invention is that information update statuses may be learned, and determination on whether the device under qualification screening 300 satisfies qualifications may be made without having to know internal concrete procedures or internal structures of an information update program.

This is possible because determination is performed using external time information that is generated upon activation of the information update program.

A second advantage is that determination on whether information to be updated is up to date may be made using a versatile method that is independent of types or methods and the like of information update programs.

This is possible because, while determination is performed using external time information that is generated upon activation of the information update program, such time information is information that is independent of types or methods and the like of information update programs.

A third advantage is that, even though time information stored at the device under qualification screening is used, an absolute time synchronization of the device under qualification screening is not required.

This is possible because a time at which information exchange was performed, which indicates a same time point at all devices, is handled together with times that are independently set within each device, and acquired time information is used after converting such information into comparable information.

Another embodiment of the present invention will now be described. Referring now to FIG. 1, the above-described embodiment is configured so that the qualification screening device 100 and the communication control device 200 are provided separately. However, the present invention is not limited to the above configuration, and for instance, the qualification screening device 100 may be provided at the position of the communication control device 200 so as to configure a single device.

This allows the number of devices configuring the qualification screening system to be reduced.

In addition, the communication control device 200 of the present invention is provided in order to forcibly restrict communication of the device under qualification screening 300 from the outside. In a case in which the device under qualification screening 300 receives notification of qualification screening results from the information reception qualification screening server section 140 to voluntarily control communication, the communication control device 200 and the communication control instruction section 130 may be omitted.

In the present invention, a status of information to be updated that is retained by the device under qualification screening 300 may be learned without having to know concrete procedures or methods for updating such information, and such information may be used as information for determination during qualification screening, independent of procedures or methods for updating such information. In other words, any information may be used for qualification screening regardless of the type thereof, as long as such information will be updated.

According to the present invention, patches and virus definition files were taken into consideration as concrete examples of information to be updated that are used for qualification screening, and updates of such files performed subsequent to a time of issuance of an essential patch or the like was considered as satisfying qualification screening conditions.

In a case in which whether the device under qualification screening 300 has viewed a given web page to be updated is set as qualification screening conditions, an exemplary application of information to be updated would be information updated as a result of an activation of a web browser by the device under qualification screening 300 by viewing the web page in question.

What is claimed is:

1. A qualification screening system comprising:
a device under qualification screening comprising a hardware processor and to which software update information is provided via a communication network; and a qualification screening device comprising a hardware processor and that determines to what extent updates of information installed on the device under qualification screening were performed, and based on the determination results, performs qualification screening to screen whether the device under qualification screening satisfies qualifications,
wherein the qualification screening device compares a differential time information between a time of a last update of an information update program retained by the device under qualification screening and a time of information exchange with a differential time information between a time of a schedule issuance of information to be updated that is retained by the qualification screening device and the time of information exchange, and, the qualification screening device, based on the comparison results, determines to what extent updates of information installed on the device under qualification screening were performed,
wherein the time of information exchange is a time point that is common to the qualification screening device and the device under qualification screening, and
wherein the qualification screening device compares a time derived by subtracting a time indicating when information to be updated will be issued, retained by the qualification screening device, from a time, indicated by a clock at which the information exchange was performed, individually retained by the qualification screening device with a time derived by subtracting a time at which an information update program retained by the device under qualification screening was last updated from a time indicated by a clock at which the information exchange was performed retained by the device under qualification screening.

2. The qualification screening system according to claim 1, comprising: the qualification screening device; the device under qualification screening; a communication control device comprising a hardware processor that controls communication between the qualification screening device and the device under qualification screening; an update information provision device comprising a hardware processor that provides software update information; and a communication network connected to the qualification screening device, the device under qualification screening, the communication control device and the update information provision device.

3. The qualification screening system according to claim 2, wherein the qualification screening device stores qualification screening condition information indicating when information to be updated will be issued; and the qualification screening device receives latest update information from an update information provision server section in the update information provision device,
wherein the qualification screening device updates the qualification screening condition information using the latest update information.

4. The qualification screening system according to claim 2, wherein the communication control device receives communication control instructions from the qualification screening device based on screening results and controls communication of the device under qualification screening.

5. The qualification screening system according to claim 2, wherein the qualification screening device is provided within the communication control device.

6. The qualification screening system according to claim 1, wherein a first determined value of the time of information exchange between the device under qualification screening and the qualification screening device, measured by the qualification screening device, is different from a second determined value of the time of information exchange between the device under qualification screening and the qualification screening device, measured by the device under qualification screening.

7. A qualification screening method in a qualification screening system comprising:
a device under qualification screening comprising a hardware processor and to which software update information is provided via a communication network; and a qualification screening device comprising a hardware processor and that determines to what extent updates of information installed on the device under qualification screening were performed, and based on the determination results, performs qualification screening to screen whether the device under qualification screening satisfies qualifications,
wherein the qualification screening method, provided in the qualification screening device, further comprises:
a comparison step of comparing a differential time information between a time of a last update of an information update program retained by the device under qualification screening and a time of information exchange with a differential time information between a time of a schedule issuance of information to be updated that is retained by the qualification screening device and the time of information exchange; and
based on the comparing results, determining to what extent updates of information installed on the device under qualification screening were performed,
wherein the time of information exchange is a time point that is common to the qualification screening device and the device under qualification screening, and
wherein the comparing the differential time information comprises comparing a time derived by subtracting a time indicating when information to be updated will be issued, retained by the qualification screening device, from a time, indicated by a clock at which the information exchange was performed, individually retained by the qualification screening device with a time derived by subtracting a time at which an information update program retained by the device under qualification screening was last updated from a time indicated by a clock at which the information exchange was performed, retained by the device under qualification screening.

8. The qualification screening method according to claim 7, wherein the qualification screening system comprises: the qualification screening device; the device under qualification screening; a communication control device comprising a hardware processor that controls communication between the qualification screening device and the device under qualification screening; an update information provision device comprising a hardware processor that provides software update information; and a communication network connected to the qualification screening device, the device under qualification screening, the communication control device and the update information provision device.

9. The qualification screening method according to claim 8, wherein the qualification screening method further comprises receiving latest update information from an update information provision server section in the update information provision device,
wherein the qualification screening condition update updates qualification screening condition information using the latest update information, the qualification screening condition information indicating when information to be updated will be issued.

10. The qualification screening method according to claim 8, wherein the communication control device receives communication control instructions from the qualification screening device based on screening results and controls communication of the device under qualification screening.

11. The qualification screening method according to claim 8, wherein the qualification screening device is provided within the communication control device.

12. A qualification screening hardware device comprising:
a hardware processor and that determines to what extent updates of information, provided over a communication network, installed on a device under qualification screening were performed, and based on the determination results, performs qualification screening to screen whether the device under qualification screening, which comprises a hardware processor, satisfies qualifications,
wherein the qualification screening device compares a differential time between a time of a last update of an information update program retained by the device under qualification screening and a time of information exchange with a differential time information between a time of a schedule issuance of information to be updated that is retained by the qualification screening device and the time of information exchange, and the qualification screening device, based on the comparison results, determines to what extent updates of information installed on the device under qualification screening were performed,
wherein the time of information exchange is a time point that is common to the qualification screening device and the device under qualification screening, and
wherein the qualification screening device compares a time derived by subtracting a time indicating when information to be updated will be issued, retained by the qualification screening device, from a time, indicated by a clock at which the information exchange was performed, individually retained by the qualification screening device with a time derived by subtracting a time at which an information update program retained by the device under qualification screening was last updated from a time indicated by a clock at which the information exchange was performed retained by the device under qualification screening.

13. A hardware device under qualification screening by a qualification screening device comprising a hardware processor and that determines to what extent updates of information, provided over a communication network, installed on the device under qualification screening were performed, and based on the determination results, performs qualification screening to screen whether the device under qualification screening satisfies qualifications, the hardware device under qualification screening comprising:
a hardware processor, an information update program; and update history information containing activation time information of the information update program,
wherein a comparison, by the qualification screening device, of a differential time information between a time of a last update of the information update program retained by the hardware device under qualification screening and a time of information exchange with a differential time information between a time of a scheduled issuance of information to be updated that is retained by the qualification screening device and the time of information exchange is performed; and a determination is made by the qualification screening device, based on the comparison results, on to what extent updates of information installed on the device under qualification screening were performed,
wherein the time of information exchange is a time point that is common to the qualification screening device and the device under qualification screening, and
wherein the qualification screening device compares a time derived by subtracting a time indicating when information to be updated will be issued, retained by the qualification screening device, from a time, indicated by a clock at which the information exchange was performed, individually retained by the qualification screening device with a time derived by subtracting a time at which an information update program retained by the device under qualification screening was last updated from a time indicated by a clock at which the information exchange was performed retained by the device under qualification screening.

* * * * *